United States Patent
Ikeda

(10) Patent No.: US 9,749,481 B2
(45) Date of Patent: Aug. 29, 2017

(54) IMAGE PROCESSING APPARATUS CAPABLE OF TRANSMITTING IMAGE DATA, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Atsushi Ikeda, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/962,051

(22) Filed: Dec. 8, 2015

(65) Prior Publication Data

US 2016/0173707 A1  Jun. 16, 2016

(30) Foreign Application Priority Data

Dec. 11, 2014  (JP) .................. 2014-250822

(51) Int. Cl.
*H04N 1/00* (2006.01)
*H04N 1/32* (2006.01)

(52) U.S. Cl.
CPC ..... *H04N 1/00244* (2013.01); *H04N 1/00236* (2013.01); *H04N 1/00281* (2013.01); *H04N 1/32422* (2013.01); *H04N 2201/0094* (2013.01)

(58) Field of Classification Search
USPC ........................................ 358/468
See application file for complete search history.

(56) References Cited

U.S. PATENT DOCUMENTS 6,301,611 B1 * 10/2001 Matsumoto ........ H04N 1/00204
709/217
6,486,976 B1 * 11/2002 Nakamura ......... H04N 1/00236
358/468
6,729,781 B2 * 5/2004 Murase .................... B41J 29/18
400/61

FOREIGN PATENT DOCUMENTS

JP  07288625 A  10/1995
JP  07288642 A  10/1995

* cited by examiner

*Primary Examiner* — Ngon Nguyen
(74) *Attorney, Agent, or Firm* — Rossi, Kimms & McDowell LLP

(57) ABSTRACT

An image processing apparatus that is capable of keeping a command concerning an original reading process with a simple configuration and of receiving a command concerning a process that is operatable concurrently with the original reading process. A scanner unit reads an original. A transmission unit transmits image data to a destination. A first determination unit determines whether a processing command received from a client apparatus is a first command that requires transmission of image data obtained by reading with the scanner unit. A second determination unit determines whether the scanner unit is in an occupied state. A reply unit replies a busy signal indicating that the scanner unit is busy to the client apparatus that transmitted the processing command until the scanner unit is no longer in the occupied state, when the scanner unit is in the occupied state and when the processing command is the first command.

11 Claims, 15 Drawing Sheets

IMAGE PROCESSING APPARATUS CAPABLE OF TRANSMITTING IMAGE DATA, CONTROL METHOD THEREFOR, AND STORAGE MEDIUM STORING CONTROL PROGRAM THEREFOR

BACKGROUND OF THE INVENTION

Field of the Invention

The present invention relates to an image processing apparatus, a control method therefor, and a storage medium storing a control program therefor, and in particular, relates to an image processing apparatus that transmits image data received from an external apparatus or image data generated by reading an original to a designated destination.

Description of the Related Art

There is a known system in which image data generated with a client computer is transmitted to a facsimile machine through a LAN (Local Area Network) and the facsimile machine faxes the image data. In this case, a user is able to designate a destination of the facsimile transmission on the client computer.

Furthermore, there is a system in which only a destination designated by a user on a client computer is notified to a facsimile machine, which is one of image processing apparatuses, without generating image data. In this system, the facsimile machine faxes image data that is generated by reading an original according to an instruction from the client computer to the designated destination (see Japanese Laid-Open Patent Publication (Kokai) No. H7-288625 (JP H7-288625A)).

Moreover, there is a known image processing apparatus that performs various processes, such as reading, recording, and communication, according to commands from an information processing terminal (see Japanese Laid-Open Patent Publication (Kokai) No. H7-288642 (JP H7-288642A)). Since this image processing apparatus performs various processes efficiently, the apparatus can receive commands even if another command is under execution.

Combination of the image processing apparatuses in the above-mentioned publications suggests a facsimile machine that can receive a command (hereinafter referred to as a scan command) to instruct reading of an original from a client computer even while reading an original according to an instruction from another client computer.

However, a facsimile machine is generally provided with only one scanner. Accordingly, even if a facsimile machine receives a plurality of scan commands simultaneously, the facsimile machine cannot process these commands at once.

For example, the facsimile machine once keeps a plurality of jobs including the scan commands, and displays destinations designated by the kept jobs as a list. Then, the facsimile machine needs to make a user select a destination (a job) before scanning.

In this case, the user needs to select a destination from the list before instructing a scan. Furthermore, the facsimile machine needs to implement the function for keeping jobs and the function for displaying a job list and performing a job selecting process.

On the other hand, a facsimile machine may be designed so as not to receive an instruction (command) of a fax transmission job from a client computer while reading an original according to an instruction from another client computer. In this case, since receptions of all the other commands are prohibited while reading an original, image data transmitted from a client computer cannot be faxed, for example.

SUMMARY OF THE INVENTION

The present invention provide an image processing apparatus, a control method therefor, and a storage medium storing a control program therefor, which are capable of keeping a command concerning an original reading process with a simple configuration and of receiving a command concerning a process that is operatable concurrently with the original reading process.

Accordingly, a first aspect of the present invention provides an image processing apparatus comprising a scanner unit configured to read an original, a transmission unit configured to transmit image data to a set-up destination, a first determination unit configured to determine whether a processing command that is received from a client apparatus is a first command that requires the transmission unit to transmit first image data obtained by reading with the scanner unit, a second determination unit configured to determine whether the scanner unit is in an occupied state, and a reply unit configured to reply a busy signal indicating that the scanner unit is busy to the client apparatus that transmitted the processing command until the scanner unit is no longer in the occupied state, when the second determination unit determines that the scanner unit is in the occupied state and when the first determination unit determines that the processing command is the first command.

Accordingly, a second aspect of the present invention provides a control method for an image processing apparatus that at least comprises a scanner unit for reading an original and a transmission unit for transmitting image data to a set-up destination, the control method comprising a first determination step of determining whether a processing command that is received from a client apparatus is a first command that requires the transmission unit to transmit first image data obtained by reading with the scanner unit, a second determination step of determining whether the scanner unit is in an occupied state, and a reply step of replying a busy signal indicating that the scanner unit is busy to the client apparatus that transmitted the processing command until the scanner unit is no longer in the occupied state, when it is determined that the scanner unit is in the occupied state in the second determination step and when it is determined the processing command is the first command in the first determination step.

Accordingly, a third aspect of the present invention provides a non-transitory computer-readable storage medium storing a control program causing a computer to execute the control method of the second aspect.

According to the invention, when a first command is received under the occupied state of the scanner unit, a busy signal will be replied to the client apparatus that transmitted the first command until the scanner unit will be no longer in the occupied state. As a result of this, a command concerning an original reading process is kept with the simple configuration and a command concerning a process that is operatable concurrently with the original reading process is received. The image processing apparatus can also include a second processing unit configured to perform a process corresponding to a second command that requires the transmission unit to transmit second image data generated by the client apparatus irrespective of whether the scanner unit is in the occupied state.

Further features of the present invention will become apparent from the following description of exemplary embodiments with reference to the attached drawings.

DESCRIPTION OF THE EMBODIMENTS

Hereafter, an example of an image processing apparatus of an embodiment according to the present invention will be described in detail with reference to the drawings.

Figure 1:
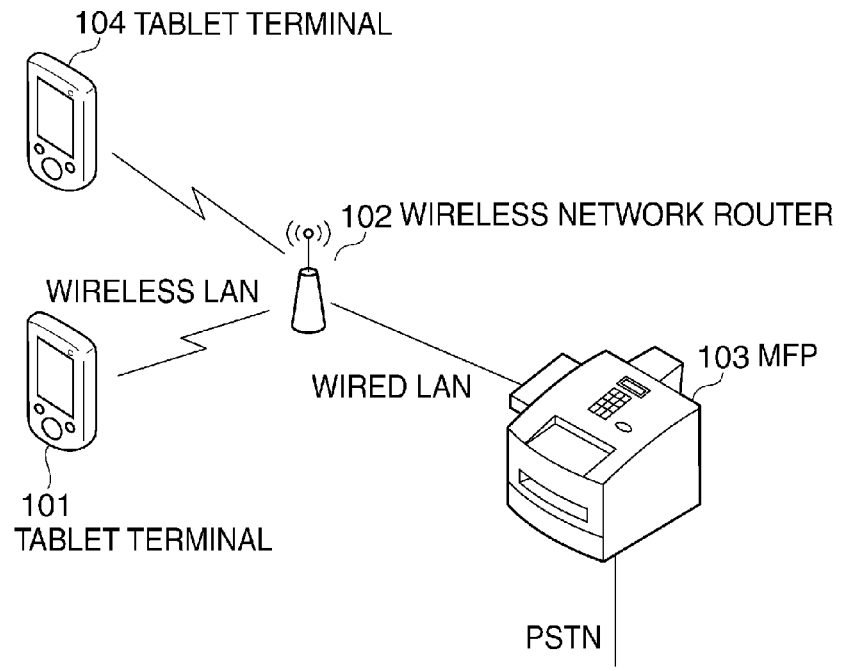
FIG. 1 is a view showing an example of a network in which an image processing apparatus according to an embodiment of the present invention is employed.

FIG. 1 is a view showing an example of a network in which an image processing apparatus according to an embodiment of the present invention is employed.

The illustrated image processing apparatus 103 is a multifunction printer (MFP), for example, and is connected to a wireless network router (wireless access point) 102 through a wired LAN (Local Area Network). Furthermore, the MFP 103 is connected to a public switched telephone network (PSTN), and has a function to perform a fax transmission through the PSTN.

A tablet terminal (client apparatus) 101, which is one of information processing apparatuses, communicates with the MFP 103 through the wireless network router 102. That is, the tablet terminal 101 is connected to the wireless network router 102 through the wireless LAN.

It should be noted that the communication path between the tablet terminal 101 and the MFP 103 is not limited to the above-mentioned example. For example, the tablet terminal 101 may be connected to the wireless network router 102 through the wired LAN. Furthermore, the MFP 103 may be connected to the wireless network router 102 through the wireless LAN. Moreover, the tablet terminal 101 and the MFP 103 may be connected to the same network.

The MFP 103 is able to communicate with a plurality of information processing apparatuses through the wireless network router 102. In the illustrated example, a tablet terminal 104 other than the tablet terminal 101 is connected to the MFP 103 through the wireless network router 102.

Figure 2:
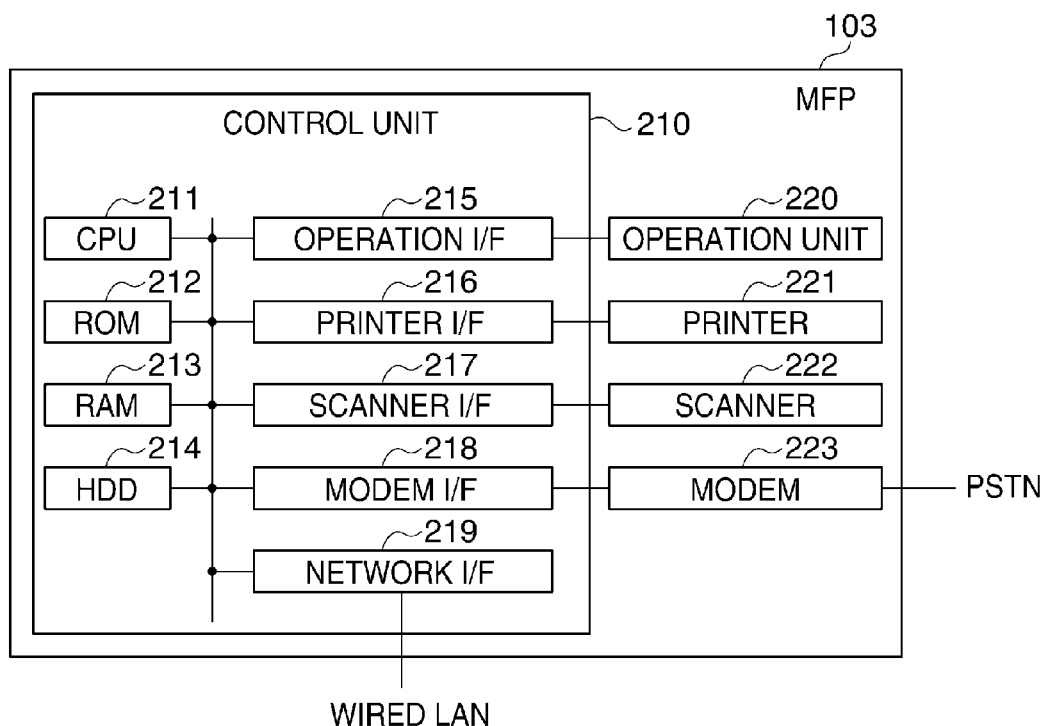
FIG. 2 is a block diagram schematically showing a hardware configuration of an MFP shown in FIG. 1.

FIG. 2 is a block diagram schematically showing a hardware configuration of the MFP 103 shown in FIG. 1.

A control unit 210 has a CPU 211, and controls the entire MFP 103. In this case, the CPU 211 reads a control program stored in a ROM 212, and performs various controls, such as reading, printing, and communication, for example. A RAM 213 is used as a main memory of the CPU 211 and a temporary memory area such as a work area.

Although the single CPU 211 shall execute processes shown in flowcharts mentioned below using one memory (the RAM 213 or an HDD 214) in the illustrated MFP 103, another configuration may be employed. For example, the processes shown in the flowcharts mentioned below may be executed by operating a plurality of CPUs and a plurality of RAMs or HDDs cooperatively.

The HDD 214 stores image data and various programs. An operation I/F (interface) 215 connects an operation unit 220 with the control unit 210. The operation unit 220 is provided with a liquid crystal display unit, which has a touch panel function, a keyboard, etc. and is used as a reception unit that receives an operation, an input, an instruction, etc. by a user.

A printer I/F 216 connects a printer 221 with the control unit 210. Image data that should be printed with the printer 221 is transmitted from the control unit 210 through the printer I/F 216. Then, the printer 221 prints an image onto a recording medium according to the image data.

A scanner I/F 217 connects a scanner 222 with the control unit 210. The scanner 222 reads an image on an original, generates image data, and sends it to the control unit 210 through the scanner I/F 217.

A modem I/F 218 connects a modem 223 with the control unit 210. The modem 223 is connected to the PSTN, faxes image data to a facsimile machine (not shown) as an external apparatus, and receives image data from the facsimile machine by facsimile.

A network I/F 219 connects the control unit 210 to the wired LAN. The MFP 103 receives image data and various information from an external apparatus through the network I/F 219, and also transmits image data and various information to an external apparatus.

Figure 3:
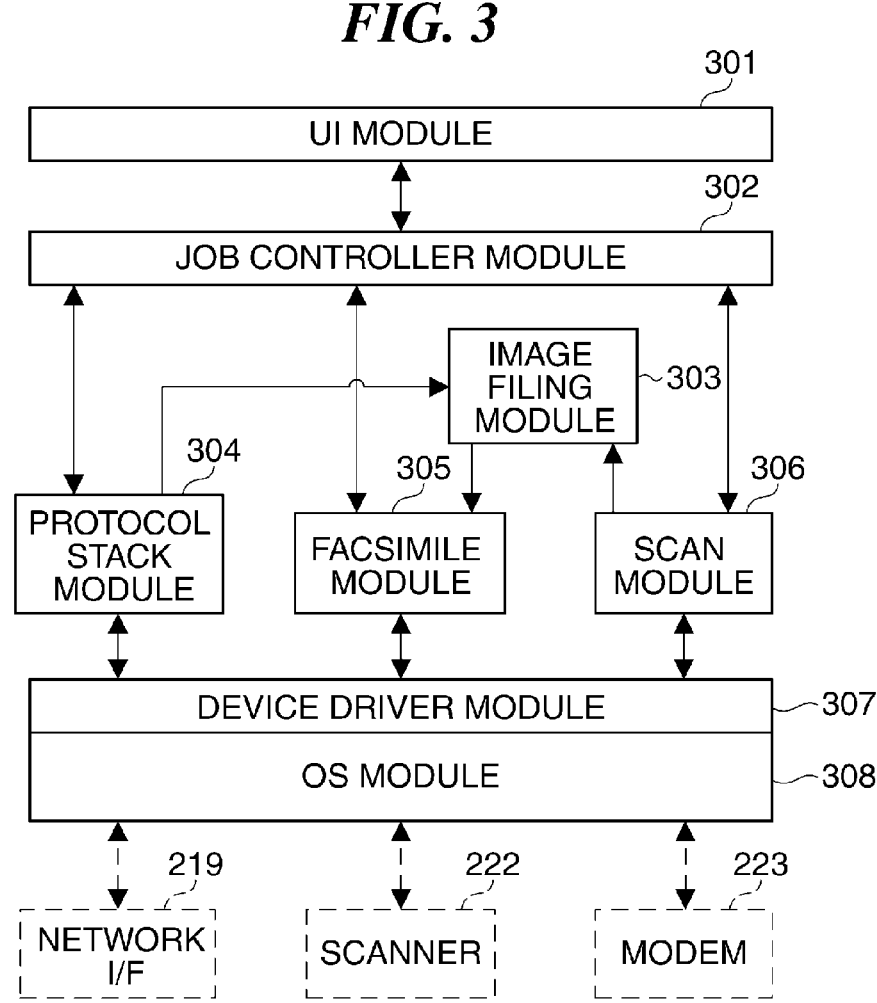
FIG. 3 is a block diagram schematically showing a software configuration of the MFP shown in FIG. 1.

FIG. 3 is a block diagram schematically showing a software configuration of the MFP 103 shown in FIG. 1.

Blocks indicated by solid lines in FIG. 3 are software modules that are implemented when the CPU 211 reads and runs programs stored in the ROM 212 or the HDD 214. A UI (User Interface) module 301 provides various information to a user and receives various instructions from a user through the operation unit 220.

A job controller module 302 receives a copy job, a print job, or a facsimile job, and controls execution of the received job. A protocol stack module 304 holds various network protocols, such as TCP/IP and HTTP (Hypertext Transfer Protocol).

In the illustrated example, the MFP 103 receives image data transmitted from the tablet terminal 101 through the network I/F 219 according to the network protocol held by the protocol stack module 304. Then, the received image data is stored in the RAM 213 or the HDD 214 by an image filing module 303. It should be noted that the image filing module 303 is a software module that manages the image data stored in the RAM 213 or the HDD 214.

The image filing module 303 does not only store the image data received through the network I/F unit 219 but also stores image data generated by reading with the scanner 222 into the RAM 213 or the HDD 214. The scan module 306 controls generation of image data by the scanner 222. A facsimile module 305 controls a facsimile communication performed by the modem 223. Then, when the MFP 103 performs fax transmission, the facsimile module 305 reads and transmits image data using the image filing module 303.

An OS (Operating System) module 308 coordinates the software modules and tasks, and manages the software modules that run on the MFP 103. A device driver module 307 is combined with the OS module 308. The device driver module 307 controls hardware devices, such as the scanner 222 and the modem 223.

Figure 4:
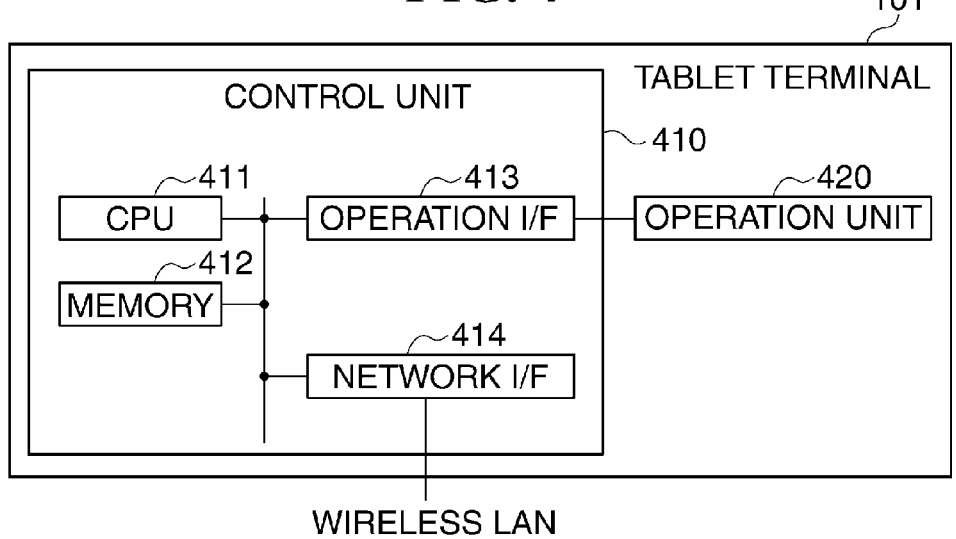
FIG. 4 is a block diagram schematically showing a hardware configuration of a tablet terminal shown in FIG. 1.

FIG. 4 is a block diagram schematically showing a hardware configuration of the tablet terminal 101 shown in FIG. 1. It should be noted that the tablet terminal 104 has the same configuration as the tablet terminal 101.

A control unit 410 has a CPU 411, and controls the entire tablet terminal 101. The CPU 411 reads a control program stored in a memory ROM 412 and performs various control processes. The memory 412 is used as a main memory of the CPU 411, and is also used as a temporary memory area such as a work area.

Although the single CPU 411 shall execute processes using the single memory 412 in the tablet terminal 101, another configuration may be employed. For example, the processes may be executed by operating a plurality of CPUs and a plurality of memories cooperatively.

An operation I/F 413 connects an operation unit 420 with the control unit 410. The operation unit 420 is provided with a liquid crystal display unit, which has a touch panel function, and is used as a reception unit that receives an operation, an input, an instruction, etc. by a user.

A network I/F 414 connects the control unit 410 to the wireless LAN. The tablet terminal 101 transmits image data and various information to an external apparatus through the network I/F 414. Furthermore, the tablet terminal 101 receives various information from an external apparatus through the network I/F 414.

Figure 5:
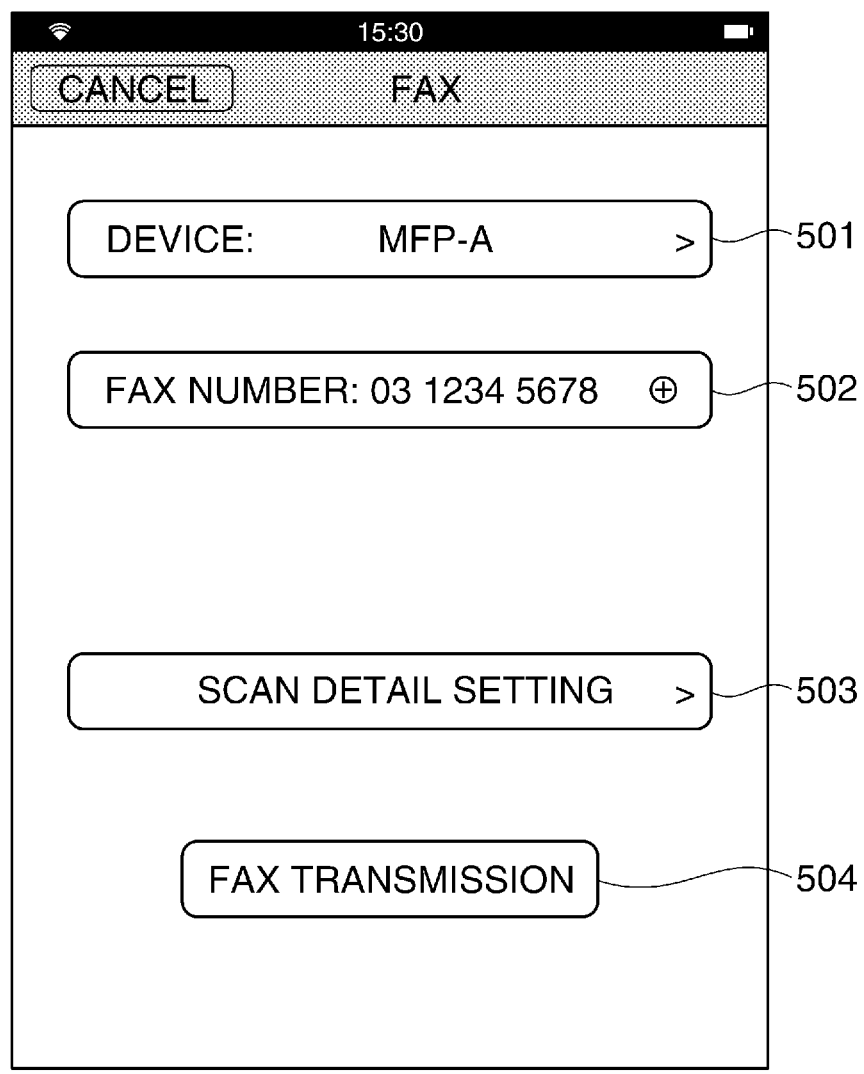
FIG. 5 is a view showing an example of an operation screen for a facsimile transmission application displayed on the tablet terminal shown in FIG. 1.

FIG. 5 is a view showing an example of an operation screen for a facsimile transmission application displayed on the tablet terminal 101 shown in FIG. 1. It should be noted that the same operation screen is also displayed on the tablet terminal 104.

The facsimile transmission application is downloaded from a server (not shown) on the Internet, for example, and is additionally installed to the tablet terminal 101. The facsimile transmission application is software operated by the OS module 308 shown in FIG. 3.

Use of the facsimile transmission application allows the tablet terminal to perform a setting that makes the MFP 103 perform the facsimile transmission. The tablet terminal 101 operates on the basis of an instruction from the facsimile transmission application as mention later.

When the facsimile transmission application is started on the tablet terminal 101, the CPU 411 displays the operation screen shown in FIG. 5 on the operation unit 420. A setting field 501 is a column for setting an MFP that performs a facsimile transmission. When the setting field 501 is touched, the CPU 411 finds MFPs located around the own device, and displays a list of the MFPs found as a result of finding on the operation unit 420. A user selects an MFP that is used to perform the facsimile transmission from the displayed list of the MFPs.

A setting field 502 is a column for setting a telephone number (facsimile number) used as a destination of the facsimile transmission. A user inputs a telephone number using the software keyboard displayed on the operation unit 420. It should be noted that the user may select a telephone number with reference to an address book stored in the memory 412.

A setting field 503 is a column for setting details of a scan process (read process) performed using the scanner 222 of the MFP 103. When the setting field 503 is touched, the CPU 411 displays a screen for designating reading parameters, such as resolution, an original size, and color/monochrome, on the operation unit 420. Then, the CPU 411 receives the reading parameters (i.e., scan setting) from the user through the screen concerned.

A facsimile transmission key 504 is a key for instructing the MFP 103 to execute the facsimile transmission. When the facsimile transmission key 504 is pressed after setting to the setting fields 501 to 503, the CPU 411 starts communications with the MFP 103.

Figure 6:
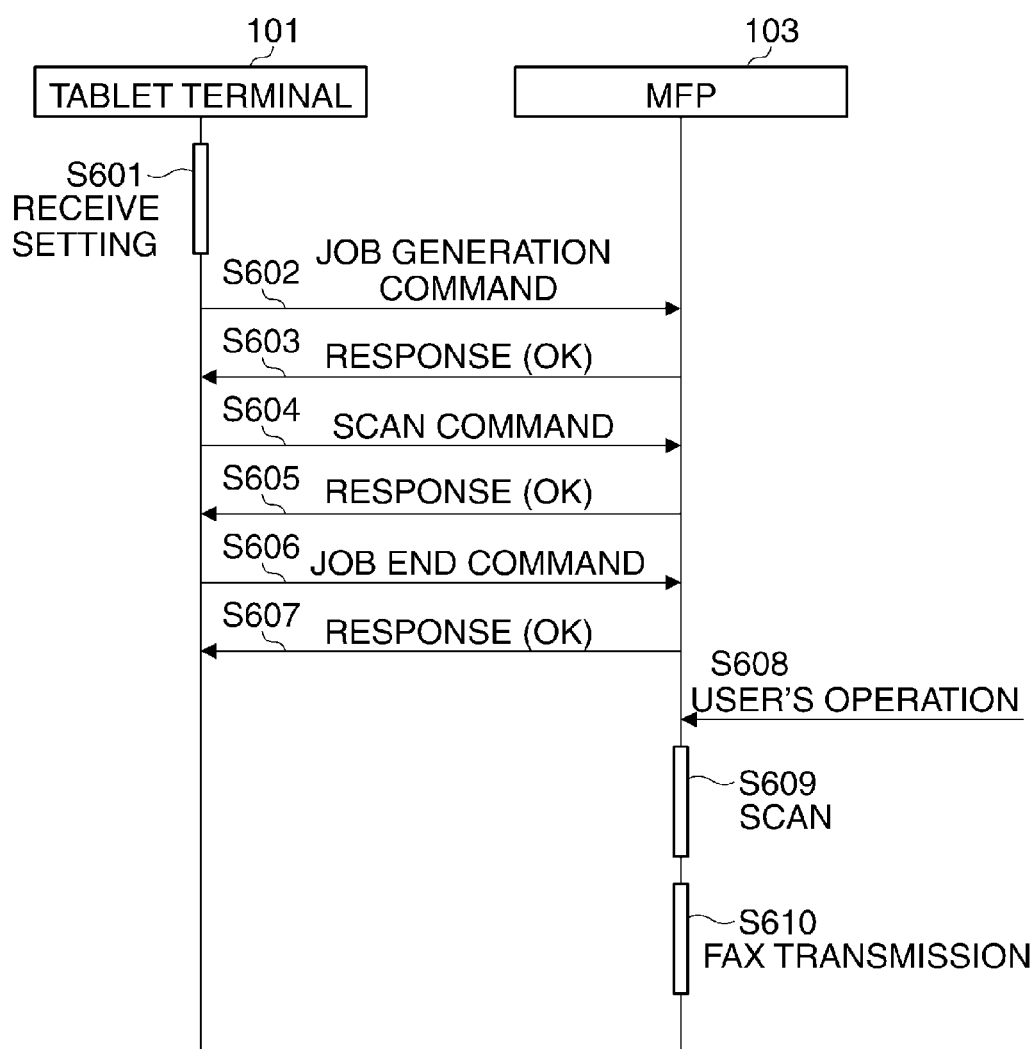
FIG. 6 is a sequential chart showing a first transmission process performed by the tablet terminal and the MFP shown in FIG. 1.

FIG. 6 is a sequential chart showing a first transmission process performed by the tablet terminal 101 and the MFP 103 shown in FIG. 1. In the first transmission process, the MFP 103 scans an original and faxes the image data obtained as the result according to the setting contents set with the tablet terminal 101. It should be noted that the tablet terminal 104 also performs the same process as the process that the tablet terminal 101 performs.

First, the CPU 411 of the tablet terminal 101 receives the setting from the user through the operation screen shown in FIG. 5 in the manner described above (step S601). Then, the CPU 411 transmits a job generation command for generating a job to the MFP 103 (step S602). When receiving the command concerned, the CPU 211 transmits an OK response (a first OK response) to the tablet terminal 101 (step S603).

When receiving the OK response, the CPU 411 transmits a scan command (one of the process commands) that instructs execution of a scan to the MFP 103 (step S604). When receiving the command concerned, the CPU 211 transmits an OK response (a second OK response) to the tablet terminal 101 after checking predetermined conditions mentioned later (step S605).

Then, when receiving the second OK response, the CPU 411 transmits a job end command for finishing a job to the MFP 103 (step S606). When receiving the job end command, the CPU 211 transmits an OK response (a third OK response) to the tablet terminal 101 (step S607).

The CPU 211 of the MFP 103 waits until receiving a user's operation. When receiving a user's operation (step S608), the CPU 211 scans an original with the scanner 222

(step S609). The CPU 211 performs the scan process according to the setting content set in the setting field 503 shown in FIG. 5.

Subsequently, the CPU 211 faxes the image data obtained by the scan process (step S610). Then, the CPU 102 finishes the process. It should be noted that the destination of the facsimile transmission is the telephone number set in the setting field 502.

Figure 7:
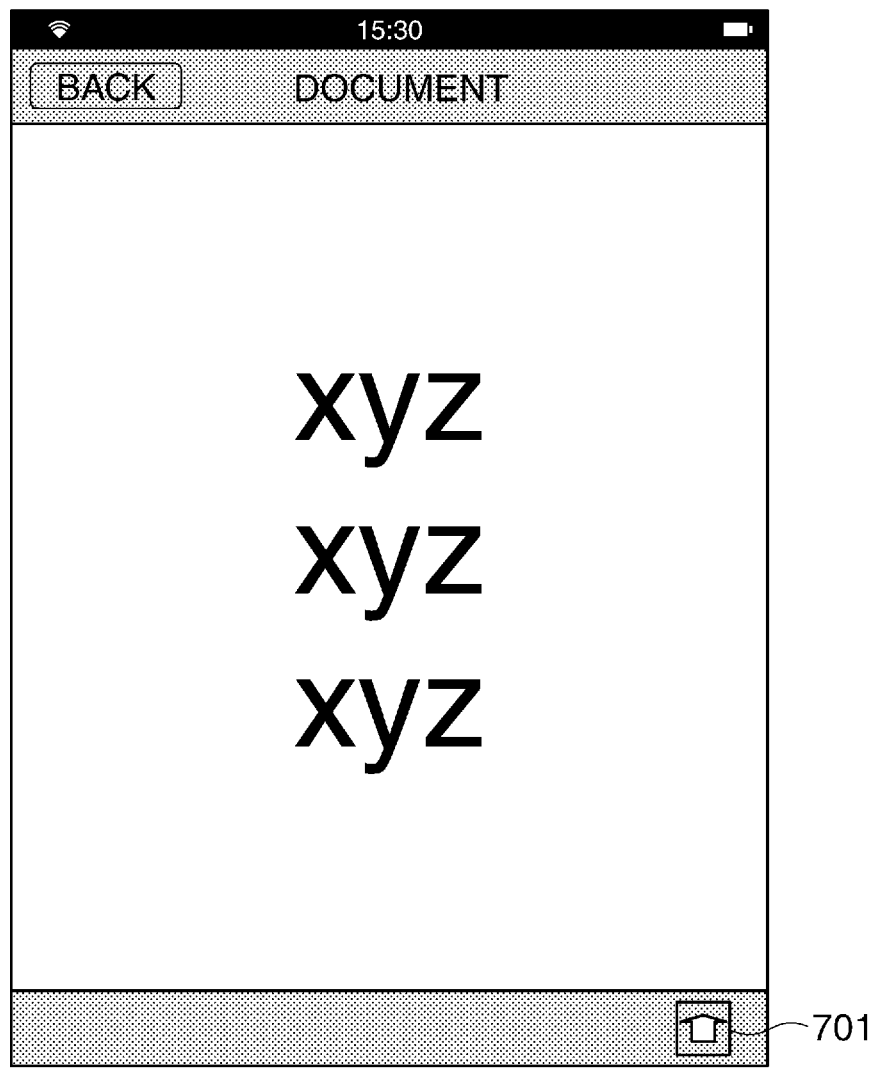
FIG. 7 is a view showing an example of an operation screen for a data management application displayed on the tablet terminal shown in FIG. 1.

FIG. 7 is a view showing an example of an operation screen for a data management application displayed on the tablet terminal 101 shown in FIG. 1.

In the tablet terminal 101, the memory 412 stores image data downloaded from the network and image data taken by a camera of the tablet terminal 101, for example. These image data are able to be displayed while changing in order using a data management application installed in the tablet terminal 101. In the example shown in FIG. 7, one of the image data stored in the memory 412 is displayed on the operation screen.

When a user presses an operation key 701 on the illustrated operation screen, the CPU 411 displays a screen (a selection screen) that is used to select a process applied to the image data currently displayed on the operation unit 420. The above-mentioned facsimile transmission application besides a mail transmission application and a print application are displayed on the selection screen as selection candidates. Then, when the user selects the facsimile transmission application, the CPU 411 displays a facsimile transmission operation screen mentioned later on the operation unit 420.

Figure 8:
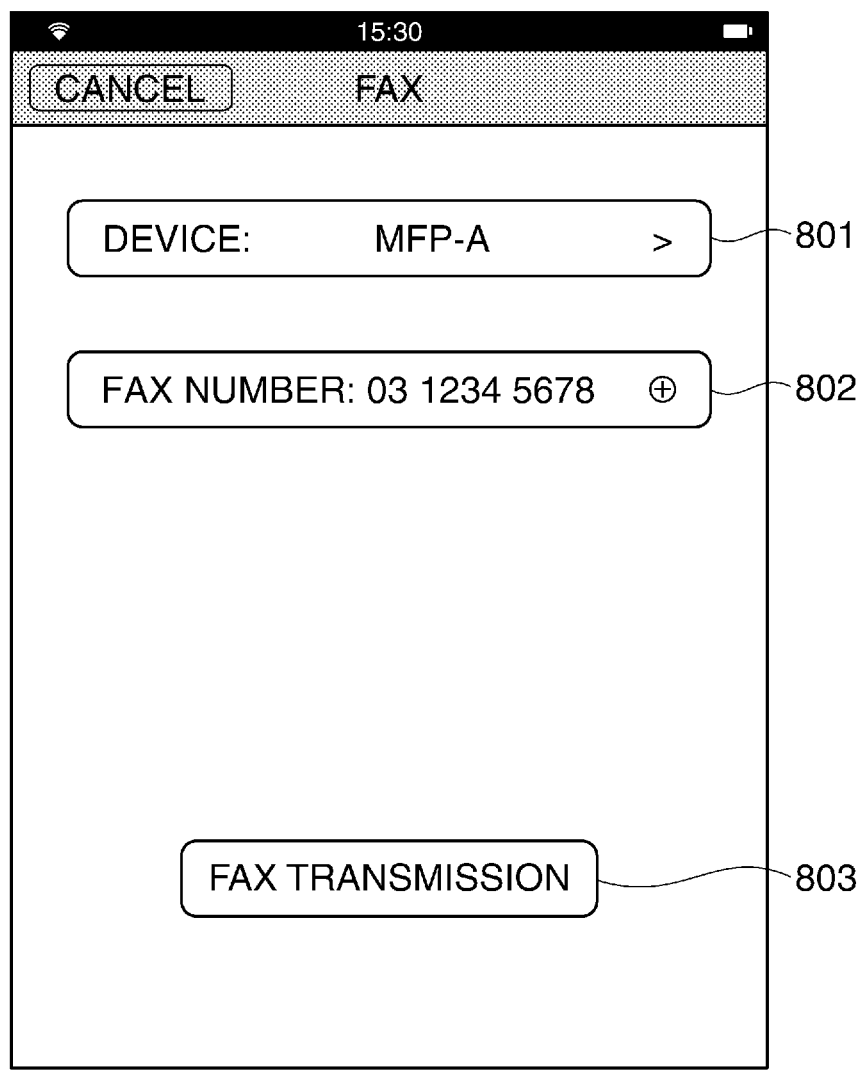
FIG. 8 is a view showing another example of the operation screen for the facsimile transmission application displayed on the tablet terminal shown in FIG. 1.

FIG. 8 is a view showing another example of the operation screen for the facsimile transmission application displayed on the tablet terminal 101 shown in FIG. 1. It should be noted that the same operation screen is also displayed on the tablet terminal 104.

Setting fields 801 and 802 in FIG. 8 are respectively similar to the setting fields 501 and 502 in FIG. 5. Moreover, a facsimile transmission key 803 is similar to the facsimile transmission key 504 in FIG. 5.

In comparison with the operation screen shown in FIG. 5, the operation screen shown in FIG. 8 does not have a field corresponding to the setting field 503 on the operation screen shown in FIG. 5. When the facsimile transmission key 803 on the operation screen shown in FIG. 8 is pressed, the MFP 103 faxes the image data selected through the operation screen shown in FIG. 7. Hereinafter, this facsimile transmission process is referred to as a second transmission process.

Figure 9:
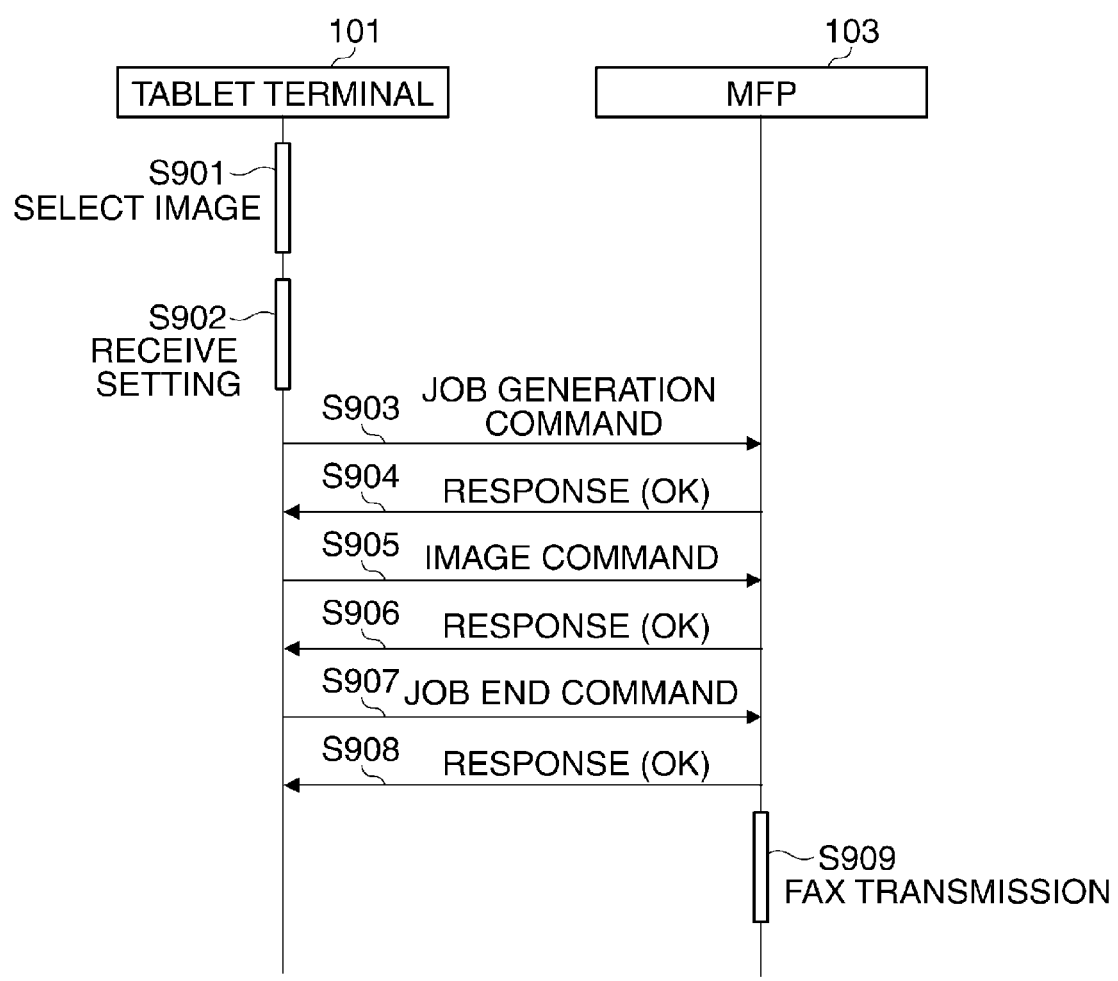
FIG. 9 is a sequential chart showing a second transmission process performed by the tablet terminal and the MFP shown in FIG. 1.

FIG. 9 is a sequential chart showing the second transmission process performed by the tablet terminal 101 and the MFP 103 shown in FIG. 1.

First, the CPU 411 of the tablet terminal 101 receives a setting about image data (selection of an image) from the user through the operation screen shown in FIG. 7 in the manner described above (step S901). Then, the CPU 411 receives the setting from the user through the operation screen shown in FIG. 8 in the manner described above (step S902).

The CPU 411 transmits a job generation command for generating a job to the MFP 103 (step S903). When receiving the command concerned, the CPU 211 transmits an OK response (a first OK response) to the tablet terminal 101 (step S904).

When receiving the OK response, the CPU 411 transmits an image command (one of the process commands) to the MFP 103 (step S905). The image command includes the image data that the MFP 103 should transmit. The image data concerned is the image data displayed on the operation screen shown in FIG. 7. When receiving the image command concerned, the CPU 211 transmits an OK response (a fourth OK response) to the tablet terminal 101 (step S906).

Then, when receiving the fourth OK response, the CPU 411 transmits a job end command for finishing a job to the MFP 103 (step S907). When receiving the job end command, the CPU 211 transmits an OK response (a third OK response) to the tablet terminal 101 (step S908).

The CPU 211 of the MFP 103 faxes the image data received from the tablet terminal 101 (step S909). The destination of the facsimile transmission concerned is the telephone number set in the setting field 802. And the CPU 201 finishes the facsimile transmission process.

In the facsimile transmission process shown in FIG. 9 (i.e., the second transmission process), the MFP 103 does not perform the scan process. Accordingly, the MFP 103 does not need to wait for a user's operation in the second transmission process.

As mentioned above, in the facsimile transmission process shown in FIG. 9 (the second transmission process), the MFP 103 faxes the image data transmitted to the MFP 103 from the tablet terminal 101 according to the setting contents set with the tablet terminal 101.

Figure 10:
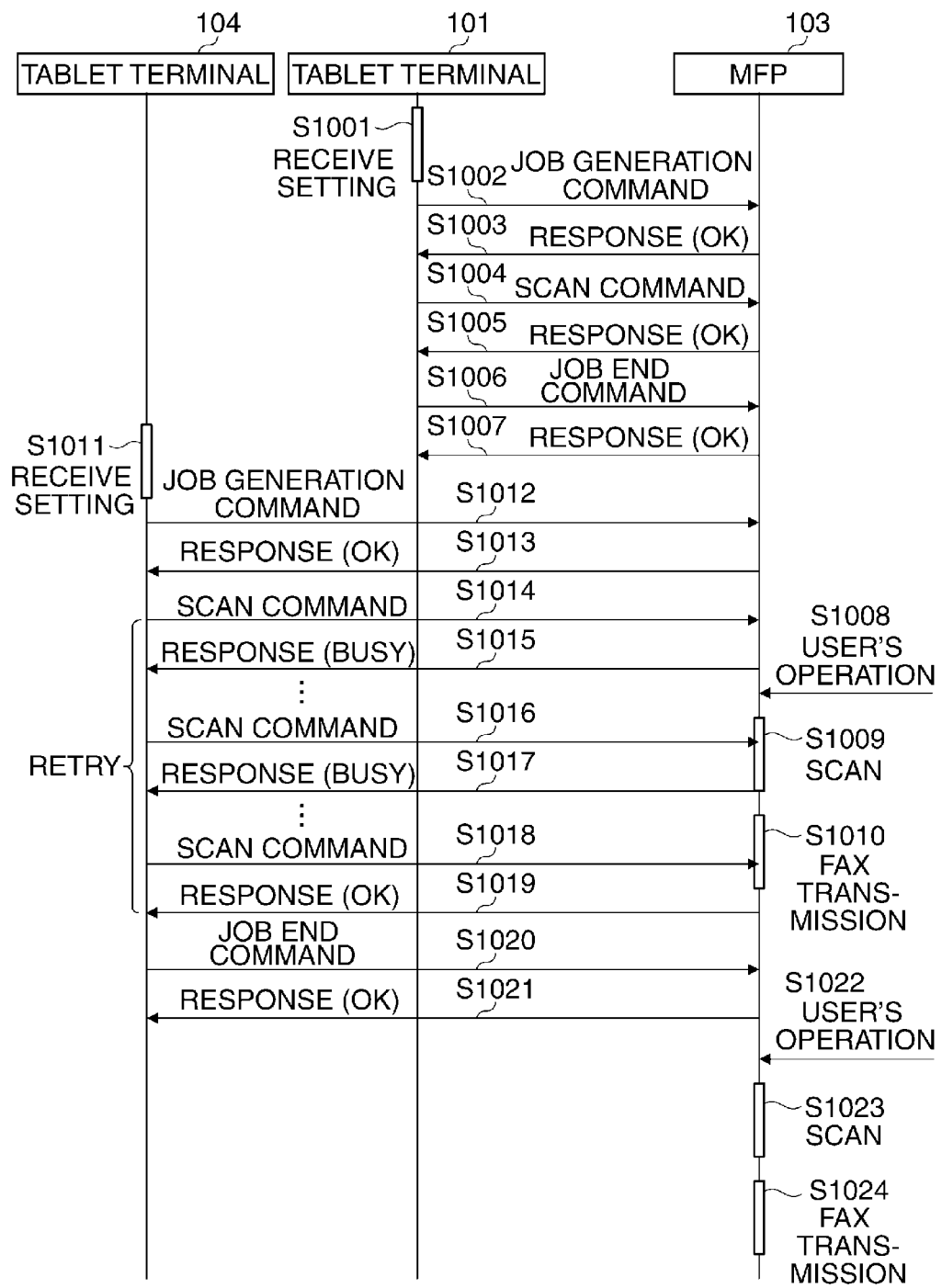
FIG. 10 is a sequential chart showing a process performed by the tablet terminals and the MFP when first transmission process demands from the two tablet terminals shown in FIG. 1 overlap.

FIG. 10 is a sequential chart showing a process performed by the tablet terminals 101, 104 and the MFP 103 when first transmission process demands from the two tablet terminals 101 and 104 shown in FIG. 1 overlap.

First, the CPU 411 of the tablet terminal 101 receives a transmission setting from the user through the operation screen shown in FIG. 5 (step S1001). Then, the CPU 411 transmits a job generation command for generating a job to the MFP 103 (step S1002). When receiving the command concerned, the CPU 211 performs a command reception response process for determining whether this command satisfies a predetermined condition.

Figure 11:
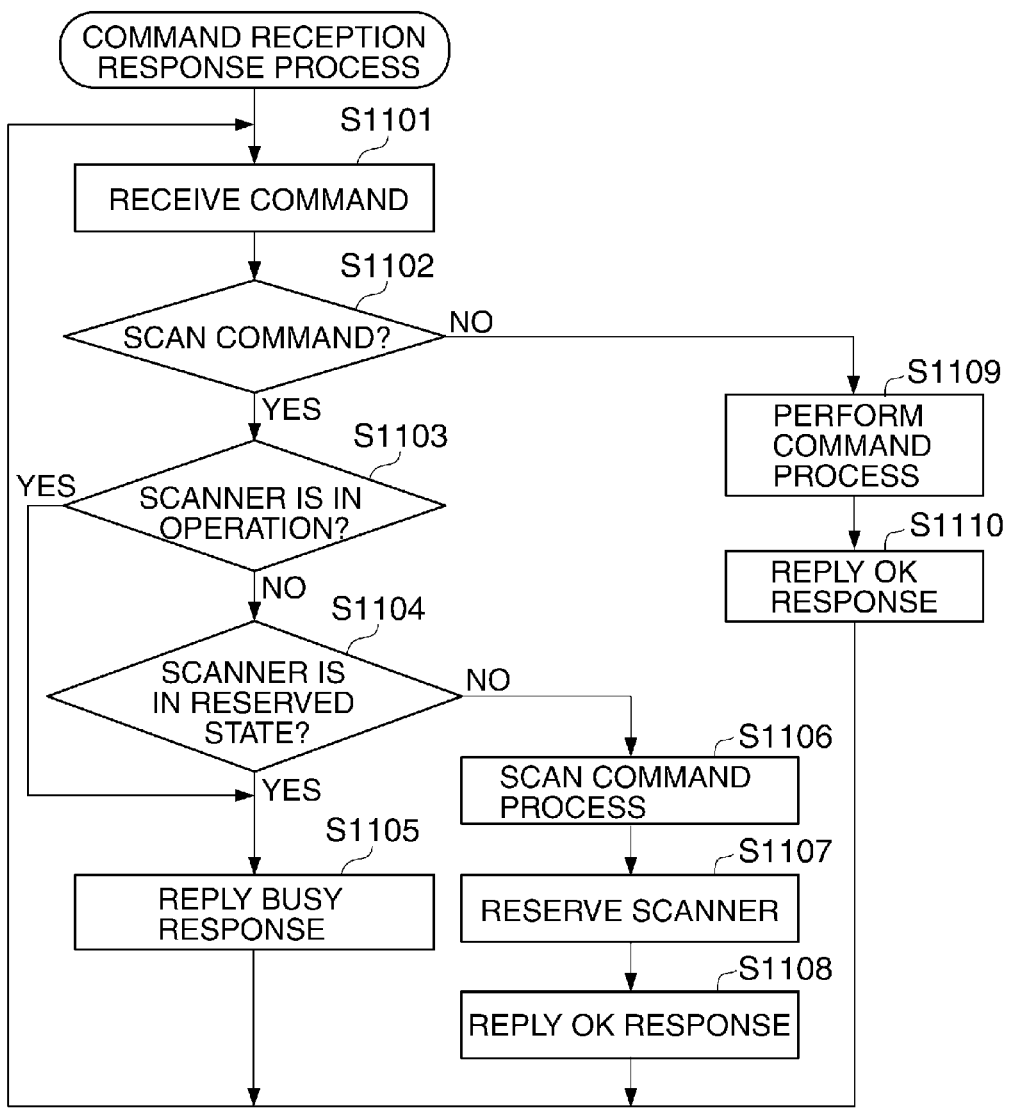
FIG. 11 is a flowchart showing a command reception response process performed by the MFP shown in FIG. 1.

FIG. 11 is a flowchart showing the command reception response process performed by the MFP 103 shown in FIG. 1. It should be noted that the process shown in the flowchart in FIG. 11 is performed when the CPU 211 executes the control program stored in the ROM 212.

When the command reception response process is started, the CPU 211 receives a command first (step S1101). Then, the CPU 211 determines whether the command concerned is a scan command (step S1102). Since the CPU 211 received the job generation command as a command in this case, it is determined that the received command is not a scan command (NO in the step S1102), and the CPU 211 performs a command process corresponding to the received command (step S1109). In this case, the CPU 211 performs the job generation process according to the job generation command. It should be noted that the description about the job generation process is omitted because the job generation process is not directly related with the embodiment.

When the job generation process is finished, the CPU 211 transmits an OK response (a first OK response) to the tablet terminal 101 (step S1110). That is, the CPU 211 transmits the first OK response to the tablet terminal 101 in the step S1003 shown in FIG. 10. Then, the CPU 211 returns the process to the step S1101.

When receiving the first OK response, the CPU 411 transmits a scan command that instructs execution of a scan to the MFP 103 (step S1004). When receiving the command, the CPU 211 determines whether the received command concerned is a scan command in step S1102 shown in FIG. 11.

Since the received command is a scan command (YES in the step S1102) in this case, the CPU 211 determines whether the scanner 222 is in operation (step S1103). When the scanner 222 is not in operation (NO in the step S1103), the CPU 211 determines whether the scanner 222 is in a reserved state (step S1104). Then, when the scanner 222 is not in the reserved state (NO in the step S1104), the CPU 211 performs a scan command process (step S1106).

Since the scanner 222 is not in operation and is not in the reserved state at the timing at which the CPU 411 transmitted the scan command to the MFP 103, the CPU 211 performs the scan command process in the step S1106. Moreover, the CPU 211 performs an inquiry process as follows in the scan command process.

Figure 12:
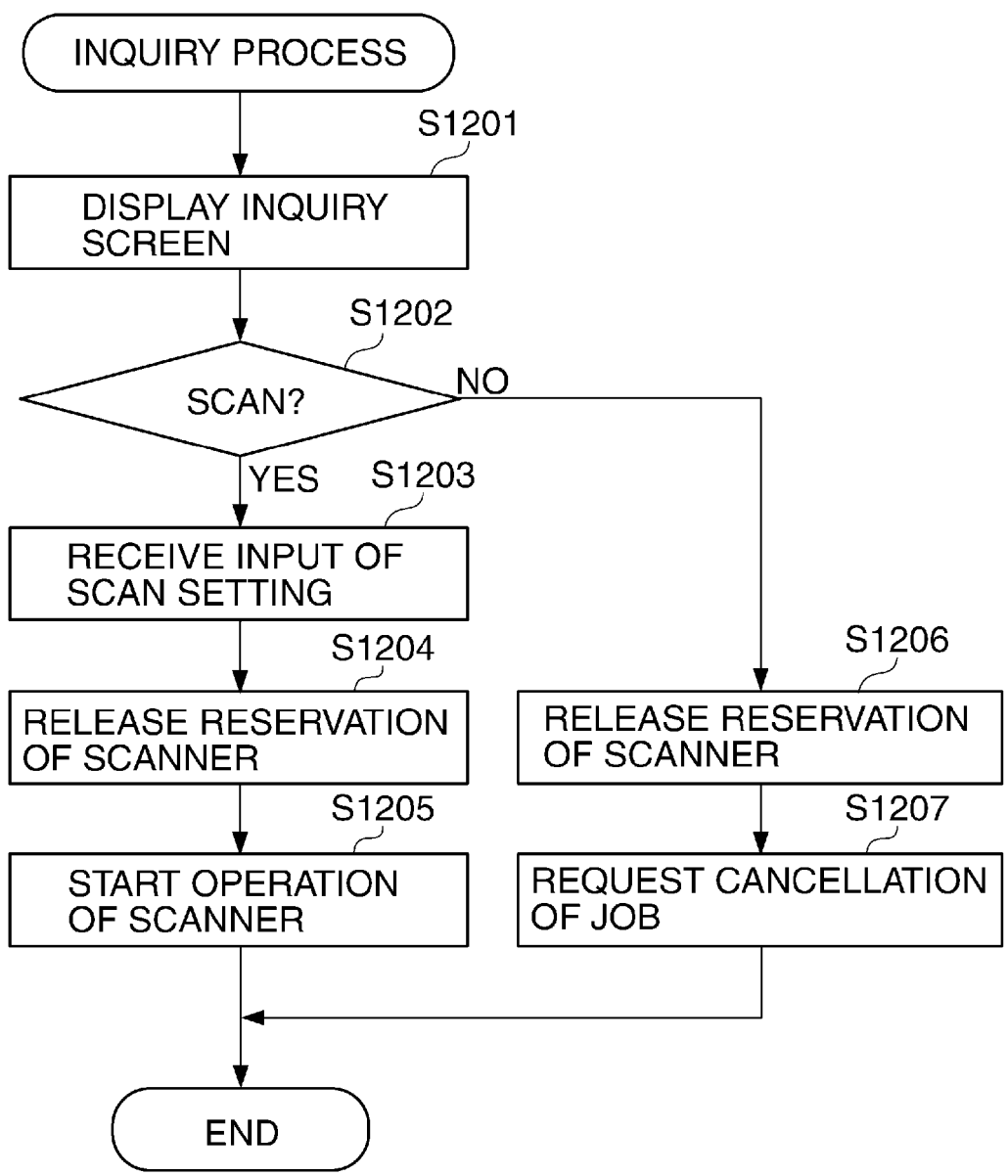
FIG. 12 is a flowchart showing an inquiry process performed by the MFP shown in FIG. 1.

FIG. 12 is a flowchart showing the inquiry process performed by the MFP 103 shown in FIG. 1. It should be noted that the process in the flowchart shown in FIG. 12 is performed when the CPU 211 executes the control program stored in the ROM 212.

When the inquiry process is started, the CPU 211 requires the UI module 301 to display an inquiry screen on the operation unit 220. When receiving a request for displaying the inquiry screen, the UI module 301 displays the inquiry screen on the operation unit 220 (step S1201).

Figure 13:
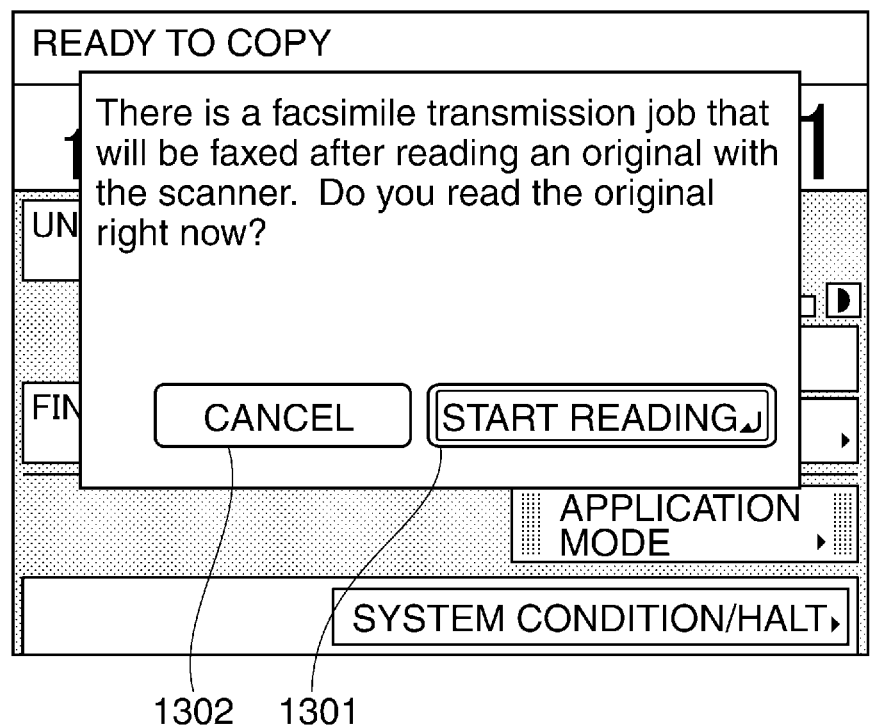
FIG. 13 is a view showing an example of an inquiry screen displayed on the MFP shown in FIG. 1.

FIG. 13 is a view showing an example of the inquiry screen displayed on the MFP 103 shown in FIG. 1.

The illustrated inquiry screen is displayed on the operation unit 220 when the scanner 222 is not in operation even if the MFP 103 is in a copy operation or a facsimile operation. Then, a reading start (scan start) button 1301 and a cancel button 1302 are displayed on the inquiry screen.

After that, the CPU 211 reserves the scanner 222 as shown in FIG. 11 (step S1107). Then, the CPU 211 transmits an OK response (a second OK response) to the tablet terminal 101 (step S1108). That is, the CPU 211 transmits the second OK response to the tablet terminal 101 in the step S1005 shown in FIG. 10, and returns the process to the step S1101.

When receiving the second OK response, the CPU 411 transmits the job end command for finishing the job to the MFP 103 (step S1006). When receiving the command, the CPU 211 determines whether the received command concerned is a scan command in step S1102 shown in FIG. 11.

Since the received command is not a scan command in this case, the CPU 211 proceeds with the process to step S1109 and performs a job ending process. Then, the CPU 211 transmits an OK response (a third OK response) to the tablet terminal 101 in the step S1007 shown in FIG. 10.

The MFP 103 waits until the user operates on the inquiry screen. When receiving a user's operation (step S1008), the CPU 211 determines whether a scan (original reading) is performed with the scanner 222 as shown in FIG. 12 (step S1202).

When the reading start button 1301 is operated in the inquiry screen shown in FIG. 13 (YES in the step S1202), the CPU 211 performs a scan with the scanner 222 in step S1009 shown in FIG. 10.

In this case, the CPU 211 displays a scan setting screen (not shown) on the operation unit 220, and receives an input of the scan setting by the user (step S1203). Then, when a start button (not shown) of the operation unit 220 is pressed, the CPU 211 releases the reservation of the scanner 222 (step S1204) just before working the scanner 222.

Subsequently, the CPU 211 instructs the scan module 306 to start a scan (step S1205), and makes the scanner 222 change to a working state. As a result of this, the scanner 222 works to read an original. When the reading of the original is completed, the CPU 211 finishes the inquiry process.

Then, the CPU 211 performs the first transmission process according to the setting contents set with the tablet terminal 101 (step S1010).

On the other hand, when the cancel button 1302 is operated in the inquiry screen shown in FIG. 13 (NO in the step S1202), the CPU 211 releases the reservation of the scanner 222 (step S1206). Then, the CPU 211 requests cancellation of the job from the job controller module 302 (step S1207), and finishes the inquiry process.

As shown in FIG. 10, the tablet terminal 104 shall receive transmission setting from another user through the operation screen shown in FIG. 5 (step S1011) after the third response is transmitted to the tablet terminal 101 in the step S1007.

As a result of this, the CPU 411 transmits a job generation command for generating a job to the MFP 103 (step S1012). When receiving the command concerned, the CPU 211 performs the command reception response process in the above-mentioned manner for determining whether this command satisfies the predetermined condition.

In this case, since the received command is not a scan command, the processes in the steps S1109 and S1110 shown in FIG. 11 are performed as mentioned above, and the CPU 211 transmits the first OK response to the tablet terminal 104 (step S1013).

When receiving the first OK response, the CPU 411 of the tablet terminal 104 transmits a scan command that instructs execution of a scan to the MFP 103 (step S1014). When receiving the command, the CPU 211 determines whether the received command concerned is a scan command in the step S1102 shown in FIG. 11.

When the received command is a scan command (YES in the S1102), the CPU 211 determines whether the scanner 222 is in operation in the step S1103.

When the scanner 222 is not in operation, the CPU 211 determines whether the scanner 222 is in the reserved state in the step S1104. When the scanner 222 is in the reserved state (YES in the step S1104), the CPU 211 transmits a busy response (a busy signal) indicating that the scanner 222 is in a busy state to the tablet terminal 104 (step S1105). That is, the CPU 211 transmits the busy response to the tablet terminal 104 in the step S1015 shown in FIG. 10, and returns the process to the step S1101.

It should be noted that the state in which the scanner is in operation or is in the reserved state is referred to as an occupied state in this description. When the scanner 222 is in operation (YES in the step S1103), the CPU 211 proceeds with the process to the step S1105.

Since the scanner 222 is in the reserved state when the CPU 411 of the tablet terminal 104 transmits the scan command to the MFP 103, the CPU 211 transmits a busy response to the tablet terminal 104 in the step S1105.

When receiving the busy response, the CPU 411 of the tablet terminal 104 transmits the scan command to the MFP 103 again (step S1016). Even if the scan command is received again, the MFP 103 transmits the busy response to the tablet terminal 104 again (step S1017) in a case where the scanner 222 is in the occupied state. Thus, the tablet terminal 104 retries the transmission of the scan command until receiving the second OK response.

Since the scanner 222 is in the reserved state when the tablet terminal 104 transmits the scan command to the MFP 103 in the step S1014 as mentioned above, the MFP 103 transmits the busy response to the tablet terminal 104 in the step S1015 in the example shown in FIG. 10.

Moreover, since the scanner 222 is in operation (in scanning) in the step S1009 when the tablet terminal 104 transmits the scan command to the MFP 103 in the step S1016, the MFP 103 transmits the busy response to the tablet terminal 104 in the step S1017.

On the other hand, when the tablet terminal 104 transmits the scan command to the MFP 103 in step S1018, the scanner 222 is not in the occupied state. Then, since the MFP 103 is performing the facsimile transmission in the step S1010, the MFP 103 transmits the second OK response to the tablet terminal 104 in step S1019. In this case, the MFP 103 displays the inquiry screen on the operation unit 220 as mentioned above.

When receiving the second OK response, the CPU 411 of the tablet terminal 104 transmits the job end command to the MFP 103 (step S1020). As a result of this, the CPU 211 proceeds with the process to step S1109 and performs the job ending process. Then, the CPU 211 transmits the OK response (the third OK response) to the tablet terminal 104 (step S1021).

As mentioned above, the MFP 103 waits until the user operates on the inquiry screen. When a user's operation is received, the CPU 211 performs the inquiry process shown in FIG. 12.

When the reading start button 1301 is operated on the inquiry screen (step S1022) (i.e., when a user's operation is received), the CPU 211 performs a scan with the scanner 222 in step S1023. Then, the CPU 211 performs the first transmission process according to the setting contents set with the tablet terminal 104 (step S1024).

When the MFP 103 receives the first transmission process demands from a plurality of tablet terminals and when the scanner 222 is in the occupied state, the MFP 103 transmits the busy response to the tablet terminal that transmitted the scan command later. As a result of this, the MFP 103 performs the scan process to the following scan command after performing the previous scan process.

Figure 14:
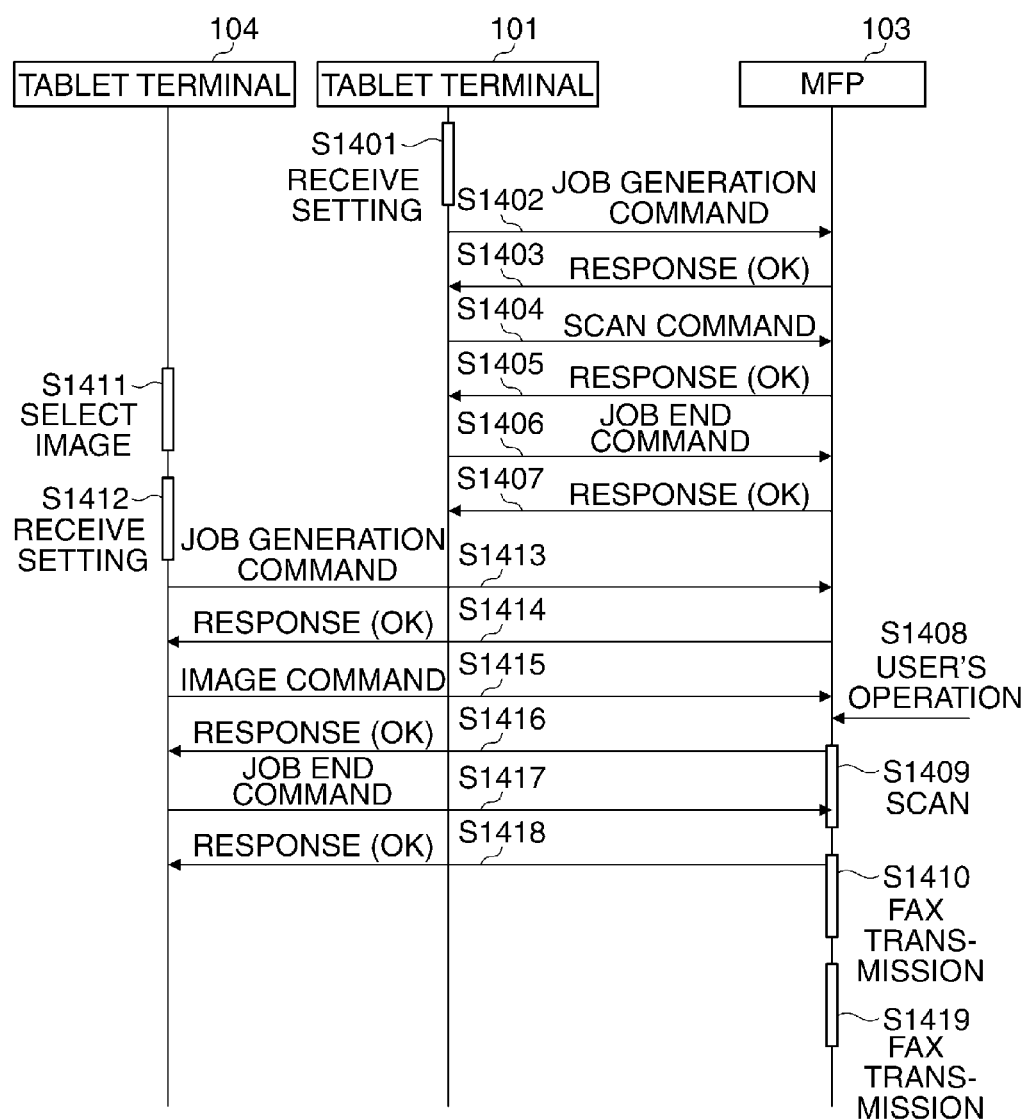
FIG. 14 is a sequential chart showing a process performed by the tablet terminals and the MFP when one of the two tablet terminals shown in FIG. 1 demands the first transmission process and the other demands a second transmission process.

FIG. 14 is a sequential chart showing a process performed by the tablet terminals 101, 104 and the MFP 103 when one of the two tablet terminals 101 and 104 shown in FIG. 1 demands the first transmission process and the other demands the second transmission process.

In the example shown in FIG. 14, the tablet terminal 101 shall demand the first transmission process and the tablet terminal 104 shall demand the second transmission process. Since the processes in the steps S1401 to S1410 in FIG. 14 are equivalent to the processes in the steps S1001 to S1010 in FIG. 10, the detailed descriptions are omitted.

The user selects an image through the operation screen (see FIG. 7) displayed on the operation unit 420 of the tablet terminal 104 (step S1411). When the image selection is received, the CPU 411 receives the setting from the user through the operation screen shown in FIG. 8 (step S1412).

Subsequently, the CPU 411 of the tablet terminal 104 transmits the job generation command to the MFP 103 (step S1413). Since the job generation command concerned is not a scan command, the CPU 211 performs a job generation process according to the job generation command in the step S1109 shown in FIG. 11. When the job generation process is completed, the CPU 211 transmits the first OK response to the tablet terminal 104 (step S1414).

When the tablet terminal 104 receives the first OK response, the CPU 411 transmits an image command to the MFP 103 (step S1415). This image command includes the image data that should be faxed from the MFP 103. It should be noted that the image data concerned is the image data displayed on the operation screen shown in FIG. 7.

Since the image command concerned is not a scan command, the CPU 211 extracts the image data included in the image command in the step S1109 shown in FIG. 11. Then, the CPU 211 saves the image data concerned with the image filing module 303 shown in FIG. 3. That is, even if the scanner is in operation or in the reserved state, the CPU 211 performs the process according to the image command. When the process according to the image command is completed, the CPU 211 transmits the fourth OK response to the tablet terminal 104 (step S1416).

When the tablet terminal 104 receives the fourth OK response, the CPU 411 transmits the job end command to the MFP 103 (step S1417). Since the job end command concerned is not a scan command, the CPU 211 performs the job end process according to the job end command in the step S1109 shown in FIG. 11. Then, the CPU 211 transmits the third OK response to the tablet terminal 104 (step S1418). The CPU 211 of the MFP 103 faxes the image data received from the tablet terminal 104 after the facsimile transmission in the step S1410 is completed (step S1419).

Thus, even if the first transmission process demand by one tablet terminal overlaps with the second transmission process demand by another tablet terminal, the MFP 103 receives the transmission process demands without making one transmission process demand into a waiting state. Then, the MFP 103 performs the facsimile transmissions sequentially from the transmission process demand of which the job finished.

Figure 15:
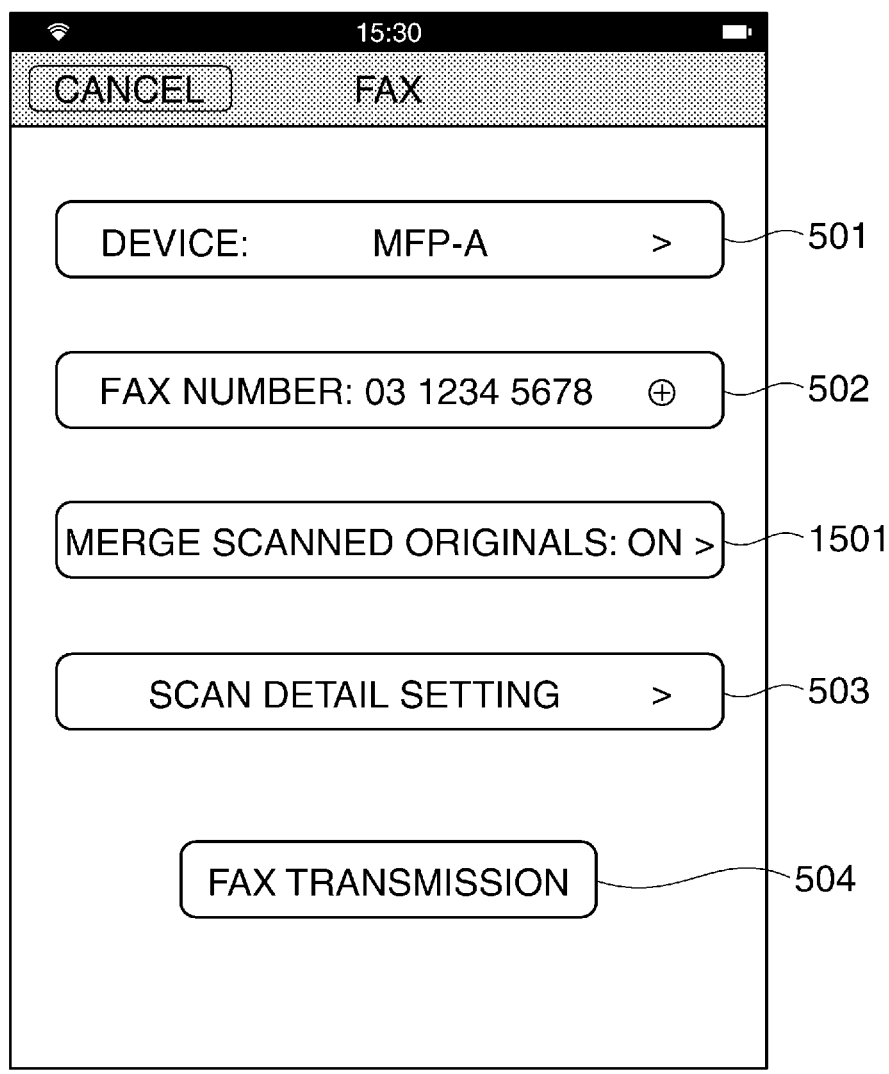
FIG. 15 is a view showing an example of an operation screen for the facsimile transmission application displayed on the tablet terminal shown in FIG. 1.

FIG. 15 is a view showing an example of the operation screen for the facsimile transmission application displayed on the tablet terminal 101 shown in FIG. 1.

Components in FIG. 15 that are identical to the components on the operation screen shown in FIG. 5 are labeled with the same reference numerals. In the operation screen shown in FIG. 15, a setting field 1501 is newly added. The setting field 1501 is used to set whether only the image data selected on the operation screen shown in FIG. 7 will be faxed or both of the image data selected on the operation screen shown in FIG. 7 and the image data obtained with the scan by the MFP 103 will be faxed. The former process is the above-mentioned second transmission process. The latter process is referred to as a third transmission process hereinafter.

In the setting field 1501, "ON" or "OFF" can be set. When "OFF" is set in the setting field 1501, the CPU 411 selects the second transmission process. On the other hand, when "ON" is set in the setting field 1501, the CPU 411 selects the third transmission process.

Figure 16:
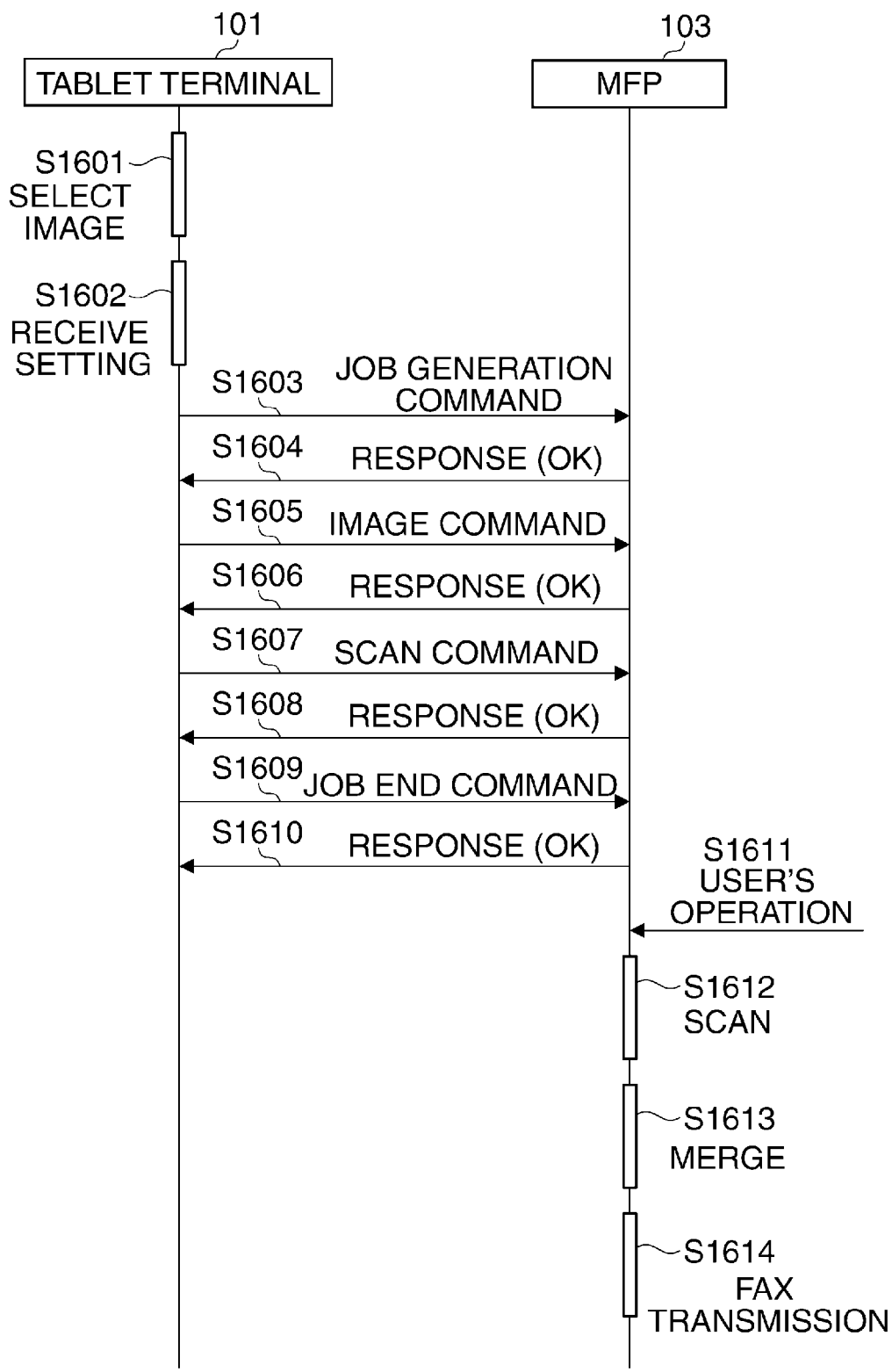
FIG. 16 is a sequential chart showing a process performed by the tablet terminal and the MFP when a third transmission process is selected in the tablet terminal shown in FIG. 1.

FIG. 16 is a sequential chart showing a process performed when the third transmission process is selected in the tablet terminal 101 shown in FIG. 1.

First, the CPU 411 of the tablet terminal 101 receives a setting about image data (an image selection) from the user through the operation screen shown in FIG. 7 (step S1601). Then, the CPU 411 receives the settings from the user through the operation screen shown in FIG. 8 (step S1602). Then, the CPU 411 transmits the job generation command to the MFP 103 (step S1603). When receiving the job generation command concerned, the CPU 211 transmits the first OK response to the tablet terminal 101 (step S1604).

When receiving the first OK response, the CPU 411 transmits the above-mentioned image command to the MFP 103 (step S1605). When receiving the image command, the CPU 211 transmits the fourth OK response to the tablet terminal 101 (step S1606).

Subsequently, the CPU 411 transmits a scan command that instructs execution of a scan to the MFP 103 (step S1607). When receiving this scan command, the CPU 211 checks whether the scanner 222 is in operation in the step S1103 and whether the scanner 222 is in the reserved state in the step S1104. That is, the CPU 211 checks whether the scanner 222 is available.

When the scanner 222 is available, the CPU 211 transmits the second OK response to the tablet terminal 101 (step S1608). When receiving the second OK response, the CPU 411 transmits the job end command to the MFP 103 (step S1609). When receiving the job end command, the CPU 211 transmits the third OK response to the tablet terminal 101 (step S1610).

As mentioned above, the CPU 211 of the MFP 103 waits until receiving a user's operation. Then, when a user's operation is received (step S1611), the CPU 211 performs the scan process for reading an original with the scanner 222 (step S1612). It should be noted that the CPU 211 performs the scan process according to the setting content set in the setting field 503 as mentioned above.

Subsequently, the CPU 211 performs a marge process (step S1613) that merges the image data (transmitted image data) transmitted from the tablet terminal 101 in step S1605 and the image data (scanned image data) obtained as a result of the scan process described in the step S1612.

It should be noted that "merge" means to combine a plurality of image data into one image data that consists of a plurality of pages (it can be referred to as a document or a document file). Then, the CPU 211 faxes the image data (merged image data) obtained by the merge process. The destination of the facsimile transmission is the telephone number set in the setting field 502.

Thus, the CPU 211 merges the image data transmitted to the MFP 103 from the tablet terminal 101 and the image data obtained by the scan process by the MFP 103 according to the setting contents set with the tablet terminal 101. Then, the MFP 103 faxes the image data obtained by the merge process to the set-up destination.

For example, the above-mentioned third transmission process is used when a cover page generated with the tablet terminal 101 and image data obtained as a result of reading an original with the MFP 103 are merged into one image data and when the merged image data is faxed. That is, if the third transmission process is performed, the time and effort needed for transmitting image data generated with the tablet terminal 101 and image data generated with the MFP 103 collectively is significantly reducible.

Figure 17:
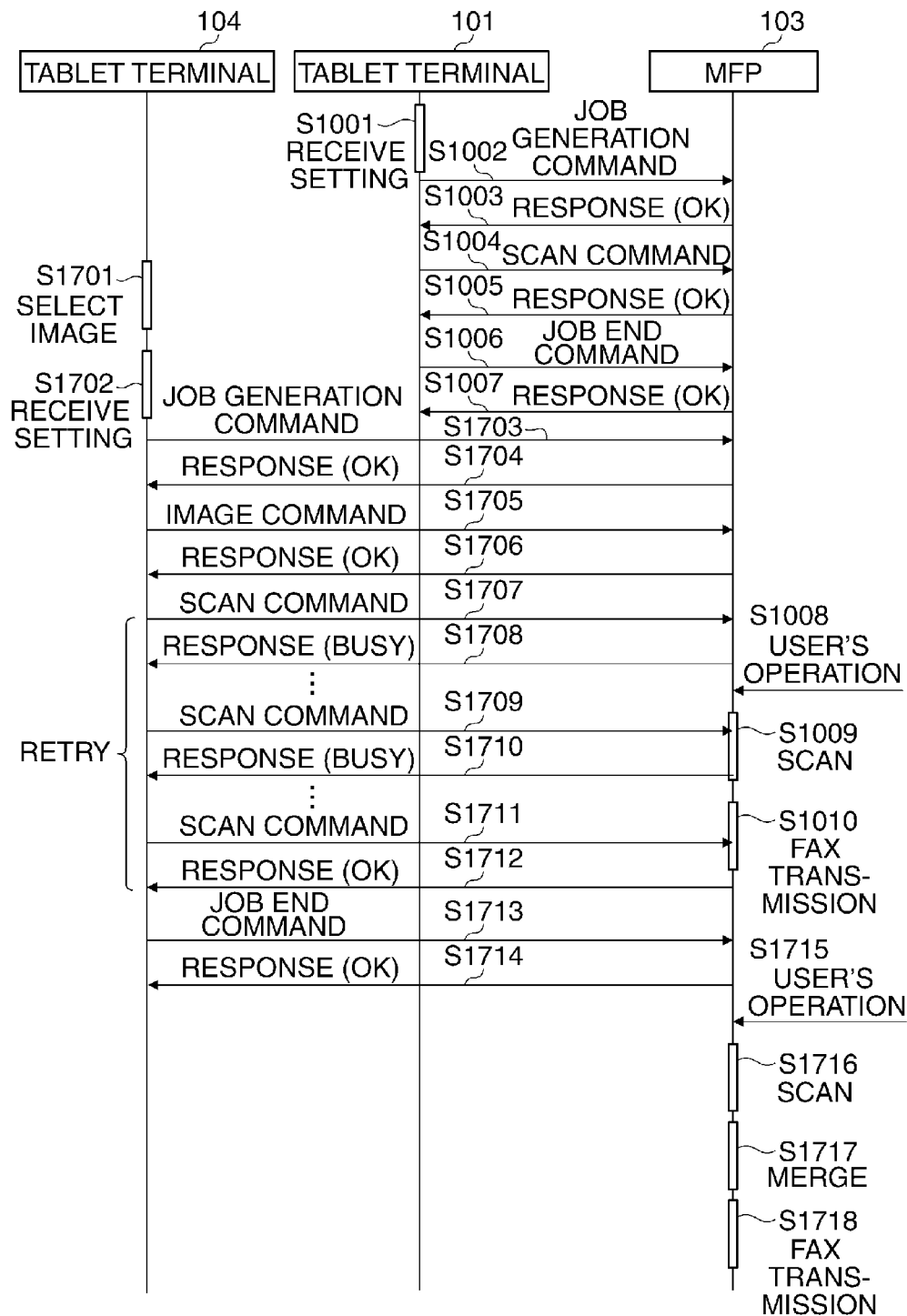
FIG. 17 is a sequential chart showing a process performed by the tablet terminals and the MFP when the first transmission process demand from one of the two tablet terminals shown in FIG. 1 overlaps with a third transmission process demand from the other.

FIG. 17 is a sequential chart showing a process performed by the tablet terminals 101, 104 and the MFP 103 when the first transmission process demand from the tablet terminal 101 shown in FIG. 1 overlaps with the third transmission process demand from the tablet terminal 104.

Since the processes from the step S1001 to the step S1010 in the first transmission process performed by the tablet terminal 101 and the MFP 103 were described with reference to FIG. 10, the descriptions for the processes concerned are omitted.

First, the CPU 411 of the tablet terminal 104 receives an image selection by the user through the operation screen shown in FIG. 7 (step S1701). Then, the CPU 411 receives the user setting through the operation screen shown in FIG. 8 (step S1702).

Subsequently, the CPU 411 of the tablet terminal 104 transmits the job generation command to the MFP 103 (step S1703). Since the CPU 211 determines that the job generation command is not a scan command, the job generation process is performed according to the job generation command. Then, the CPU 211 transmits the first OK response to the tablet terminal 104 (step S1704).

When receiving the first OK response, the CPU 411 transmits the image command to the MFP 103 (step S1705). Since the CPU 211 determines that the image command is not a scan command, the CPU 211 extracts the image data included in the image command, and saves the image data concerned with the image filing module 303 (FIG. 3). In this case, even if the scanner 222 is in the occupied state, the CPU 211 performs the process according to the image command. Then, the CPU 211 transmits the fourth OK response to the tablet terminal 104 (step S1706).

Subsequently, the CPU 411 of the tablet terminal 104 transmits the scan command to the MFP 103 (step S1707). When receiving the scan command, the CPU 211 determine whether the scanner 222 is in the occupied state as described with reference to FIG. 11.

In this case, the scanner is in the reserved state by the scan command received from the tablet terminal 101. Accordingly, the CPU 211 determines that the scanner is in the reserved state. Then, the CPU 211 transmits the busy response to the tablet terminal 104 (step S1708). It should be noted that the MFP 103 holds the image data saved with the image filing module 303, even if the MFP 103 transmits the busy response. That is, the image data that belongs to the generated job is held until the job concerned is completed or is finished abnormally.

When receiving the busy response, the CPU 411 retries the transmission of the scan command until receiving the OK response (second OK response). That is, the CPU 411 transmits the scan command to the MFP 103 again (step S1709). As illustrated, the scan command concerned is transmitted to the MFP 103 at the timing of the scan process in the step S1009. Accordingly, the CPU 211 determines that the scanner 222 is in operation, and transmits the busy response to the tablet terminal 104 (step S1710).

When receiving the busy response, the CPU 411 transmits the scan command to the MFP 103 again (step S1711). As illustrated, the scan command concerned is transmitted to the MFP 103 at the timing of the facsimile transmission in the step S1010. Accordingly, the CPU 211 determines that the scanner 222 is not in the occupied state, and transmits the second OK response to the tablet terminal 104 (step S1712).

When receiving the second OK response, the CPU 411 transmits the job end command to the MFP 103 (step S1713). Since the CPU 211 determines that the job end command is not a scan command, the job ending process is performed according to the job end command. Then, the CPU 211 transmits the third OK response to the tablet terminal 104 (step S1714).

Then, the CPU 211 of the MFP 103 performs the processes in steps S1715 to S1718. Since the processes in the steps S1715 to S1718 are equivalent to the processes in the steps S1611 to S1614, the detailed descriptions are omitted.

Thus, when the first transmission process demand overlaps with the third transmission process demand, the MFP 103 receives and saves image data from the tablet terminal 104 that demands the third transmission process without waiting. Then, the MFP 103 transmits the busy response to the scan command received later while holding the image data concerned, waits until the scan corresponding to the previous scan command is completed, and performs facsimile transmissions in order.

As mentioned above, the scan command concerning the original reading process is kept with the simple configuration and a command concerning a process that is operatable concurrently with the original reading process is received in the embodiment of the present invention.

Although a tablet terminal is described as an example of the information processing apparatus in the above-mentioned embodiment, the embodiment is applicable similarly to other information processing apparatuses, such as a PC and a mobile phone.

Although the MFP 103 determines whether the scanner is in operation or in the reserved state in the above-mentioned embodiment, one semaphore for the scanner may be prepared, for example. In such a case, the semaphore is obtained so as to occupy the scanner at the time of receiving a scan command and at the time of starting an operation using the scanner, such as a copy and a facsimile. Although such a configuration elongates the period during which the busy response is returned to the scan command as compared with the above-mentioned embodiment because the scanner is occupied at the time of starting an operation using the scanner, such as a copy and a facsimile, the same effect as the embodiment is obtained.

In the example shown in FIG. 2, the CPU 211, the modem I/F 217, and the modem 223 function as a transmission unit, and the CPU 211 functions as a first determination unit and a second determination unit as clearly described in the above-mentioned description. The CPU 211 and the network I/F 219 function as a reply unit. Moreover, the CPU 211 functions as a first processing unit, a second processing unit, and a merge processing unit.

Although the embodiments of the present invention have been described, the present invention is not limited to the above-mentioned embodiments, the present invention includes various modifications as long as the concept of the invention is not deviated.

For example, the functions of the above mentioned embodiments may be achieved as a control method that is executed by an image processing apparatus. Moreover, the functions of the above mentioned embodiments may be achieved as a control program that is executed by a computer with which the image processing apparatus is provided. It should be noted that the control program is recorded into a computer-readable storage medium, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-250822, filed Dec. 11, 2014, which is hereby incorporated by reference herein in its entirety.

What is claimed is:

1. An image processing apparatus comprising:
a scanner configured to read an original;
a facsimile transmission interface configured to receive or transmit data; and
a processor connected to a memory and configured to execute instructions to provide:
a transmission unit configured to transmit image data to a destination via the facsimile transmission interface, wherein the scanner and the transmission unit are configured to be operatable concurrently;
a first determination unit configured to determine whether a processing command that is received from a client apparatus is a first command or a second command, wherein the first command is a scan command that requires the transmission unit to transmit first image data obtained after reading the original with the scanner, and wherein the second command is an image command that requires the transmission unit to transmit second image data received from the client apparatus;
a second determination unit configured to determine, in a case where the received processing command is the first command, whether the scanner is in an occupied state;
a reply unit configured to reply, in a case where the first determination unit determines that the processing command is the first command and the second determination unit determines that the scanner is in the occupied state, a notification signal indicating that the scanner is occupied, to the client apparatus that transmitted the first command; and
a command processing unit configured to instruct the transmission unit to transmit the second image data, in a case where the first determination unit determines that the processing command is the second command that requires the transmission unit to transmit the received second image data,
wherein, in the case where the processing command is the second command, data transmission of the received second image data is performed concurrently with an operation of the scanner even if the second determination unit determines that the scanner is in an occupied state.

2. The image processing apparatus according to claim 1, wherein the reply unit is configured to reply the notification signal whenever the first command is received from the client apparatus until the scanner is no longer in the occupied state.

3. The image processing apparatus according to claim 1, wherein the processor is further configured to execute instructions to provide a first processing unit configured to perform a process corresponding to the processing command, in a case where the second determination unit determines that the scanner is not in the occupied state and the first determination unit determines that the processing command is the first command.

4. The image processing apparatus according to claim 3, wherein the second determination unit is configured to determine that the scanner is in the occupied state when the scanner is in operation or when the scanner is in a reserved state, and
wherein the first processing unit configured to bring the scanner into the reserved state when performing the process corresponding to the first command.

5. The image processing apparatus according to the claim 4, wherein the first processing unit is configured to release reservation of the scanner just before working the scanner in response to the first command.

6. The image processing apparatus according to claim 1, wherein the processor is further configured to execute instructions to provide a merge processing unit configured to transmit merged image data that is obtained by merging the first image data and the second image data to the destination with the transmission unit, in a case where both the first command and the second command are received from the client apparatus.

7. The image processing apparatus according to claim 1, wherein the facsimile transmission interface is a modem, and
wherein the transmission unit is configured to transmit the image data to the destination using facsimile communication through the modem.

8. A control method for an image processing apparatus that comprises a scanner for reading an original, a facsimile transmission interface for receiving or transmitting data, a transmission unit for transmitting image data to a destination via the facsimile transmission interface, the scanner and the transmission unit adapted to be operatable concurrently, and a processor for executing the control method, the control method comprising:
determining whether a processing command that is received from a client apparatus is a first command or a second command, wherein the first command is a scan command that requires the transmission unit to transmit first image data obtained after reading the original with the scanner, and wherein the second command is an image command that requires the transmission unit to transmit second image data received from the client apparatus;
determining, in a case where the received processing command is the first command, whether the scanner is in an occupied state;
replying, in a case where it is determined that the processing command is the first command and the scanner is in the occupied state, a notification signal indicating that the scanner is occupied, to the client apparatus that transmitted the first command; and
instructing the transmission unit to transmit the second image data, in a case where it is determined that the processing command is the second command that requires the transmission unit to transmit the received second image data,
wherein, in the case where the processing command is the second command, data transmission of the received second image data is performed concurrently with an operation of the scanner even if it is determined that the scanner is in an occupied state.

9. A non-transitory computer-readable storage medium storing a control program causing a computer to execute a control method for an image processing apparatus that comprises a scanner for reading an original, a facsimile transmission interface for receiving or transmitting data, a transmission unit for transmitting image data to a destination via the facsimile transmission interface, the scanner and the transmission unit adapted to be operatable concurrently, and a processor for executing the control method, the control method comprising:
determining whether a processing command that is received from a client apparatus is a first command or a second command, wherein the first command is a scan command that requires the transmission unit to transmit first image data obtained after reading the original with the scanner, and wherein the second command is an image command that requires the transmission unit to transmit second image data received from the client apparatus;
determining, in a case where the received processing command is the first command, whether the scanner is in an occupied state;
replying, in a case where it is determined that the processing command is the first command and the scanner is in the occupied state, a notification signal indicating that the scanner is occupied, to the client apparatus that transmitted the first command; and
instructing the transmission unit to transmit the second image data, in a case where it is determined that the processing command is the second command that requires the transmission unit to transmit the received second image data,
wherein, in the case where the processing command is the second command, data transmission of the received second image data is performed concurrently with an operation of the scanner even if it is determined that the scanner is in an occupied state.

10. An image processing apparatus comprising:
a scanner configured to read an original;
a transmission interface configured to transmit data to an external apparatus, wherein the scanner and the transmission interface are configured to be operatable concurrently;
a memory device configured to store a set of instructions; and
at least one processor configured to execute the set of instructions to:
determine whether the scanner is in an occupied state;
send, in a case where it is determined that the scanner is in the occupied state, and where a first command that requires transmitting first image data, which is obtained by reading the original with the scanner, and transmitted using the transmission interface, is received from a client apparatus, to the client apparatus a notification signal indicating that the scanner is occupied as a response to the first command and not perform data transmission based on the received first command; and
transmit, in a case where it is determined that the scanner is in the occupied state, and where a second command that requires transmitting second image data, which is received from a client apparatus, and transmitted using the transmission interface is received from the client apparatus, the second image data to a destination using the transmission interface based on the received second command,
wherein, in the case where the second command is received, data transmission based on the received second command is performed concurrently with an operation of the scanner even if the scanner is in the occupied state, wherein the first command is a scan command, and wherein the second command is an image command.

11. The image processing apparatus according to claim 10, wherein the transmission interface is a modem and the image data is transmitted using facsimile communication through the modem.

* * * * *